US012182468B2

(12) United States Patent
Sekine (10) Patent No.: US 12,182,468 B2
(45) Date of Patent: Dec. 31, 2024

(54) SYSTEM THAT CAUSES SHARER TO DETECT IDENTITY DURING SCREEN SHARING AND SYSTEM THAT CAUSES SHARER TO DETECT INFORMATION REGARDING INPUTTED ANSWER SECTION

(71) Applicant: INTERACTIVE SOLUTIONS CORP., Tokyo (JP)

(72) Inventor: Kiyoshi Sekine, Tokyo (JP)

(73) Assignee: Interactive Solutions Corp., Tokyo (JP)

( * ) Notice: Subject to any disclaimer, the term of this patent is extended or adjusted under 35 U.S.C. 154(b) by 0 days.

(21) Appl. No.: 18/019,095

(22) PCT Filed: Dec. 28, 2021

(86) PCT No.: PCT/JP2021/048760
§ 371 (c)(1),
(2) Date: Jan. 31, 2023

(87) PCT Pub. No.: WO2022/254765
PCT Pub. Date: Dec. 8, 2022

(65) Prior Publication Data
US 2024/0256210 A1  Aug. 1, 2024

(30) Foreign Application Priority Data
Jun. 4, 2021 (JP) ................. 2021-094703

(51) Int. Cl.
*G06F 3/14* (2006.01)
*G06F 3/0481* (2022.01)

(52) U.S. Cl.
CPC .......... *G06F 3/1462* (2013.01); *G06F 3/0481* (2013.01)

(58) Field of Classification Search
CPC ............................ G06F 3/1462; G06F 3/0481
See application file for complete search history.

(56) References Cited

U.S. PATENT DOCUMENTS

2010/0115407 A1* 5/2010 Kim ...................... G06F 3/0481
715/708

FOREIGN PATENT DOCUMENTS

| JP | 2003-044417 A | 2/2003 |
| JP | 2010-212837 A | 9/2010 |

(Continued)

OTHER PUBLICATIONS

Nagase et al. JP 2019-164560 A machine translation (Year: 2024).*

*Primary Examiner* — Gustavo Polo
(74) *Attorney, Agent, or Firm* — Pyprus Pte Ltd; George D. Liu (57) ABSTRACT

[Problem] To provide a system for notifying a user of whether contents displayed on terminals between a plurality of users are identical and a system with which, when an input is made on one terminal in one answer section of a questionnaire, information regarding a question item corresponding to the above-described answer section is displayed on another terminal.[Solution] A system 1 is connected to a first and a second terminals 3, 5. When an object displayed on a screen of the first terminal 3 is a first object and an object corresponding to the first object displayed on a screen of the second terminal 5 is a second object, the system 1 causes one or both of the screens of the first and the second terminals 3,5 to display: one or both of an identicalness sign 11 as a display regarding that the first object and the second object are identical, and a discrepancy sign 13 as a display regarding that the first object and the second object are different.

6 Claims, 8 Drawing Sheets

(56) References Cited

FOREIGN PATENT DOCUMENTS

| | | |
|---|---|---|
| JP | 2012-209614 A | 10/2012 |
| JP | 2016-053773 A | 4/2016 |
| JP | 2016-170614 A | 9/2016 |
| JP | 2016-186710 A | 10/2016 |
| JP | 2019-164560 A | 9/2019 |

* cited by examiner

11 — ◯  PARTICIPANT A

11 — ◯  PARTICIPANT B

13 — ✕  PARTICIPANT C

13 — ✕  PARTICIPANT D

| NUMBER/PROPORTION OF IDENTICALNESS DISPLAY | 8/10 | 80% |

(a)

| NUMBER/PROPORTION OF DISCREPANCY DISPLAY | 2/10 | 20% |

SYSTEM THAT CAUSES SHARER TO DETECT IDENTITY DURING SCREEN SHARING AND SYSTEM THAT CAUSES SHARER TO DETECT INFORMATION REGARDING INPUTTED ANSWER SECTION

TECHNICAL FIELD

This invention relates to a system that causes a sharer to detect identity during screen sharing. In more detail, this invention relates to a system for notifying a sharer of whether contents displayed on terminals are identical between a plurality of users. This invention also relates to a system that notifies a sharer of information regarding an inputted answer section.

BACKGROUND ART

Even when a screen content is shared in a plurality of terminals, it is difficult for one sharer to know which part of the screen content is displayed on screens, and thus, there has been a problem of inability of appropriately sharing information between sharers.

Japanese Unexamined Patent Application Publication No. 2016-053773 describes a system that efficiently displays a component that should be shared. There has been publicly known a system that determines whether the component is set for shared display and efficiently displays a component that should be shared and displayed. However, there has not yet been known a system that allows a sharer to detect identity of screen displays during screen sharing or a system that notifies a sharer of information regarding an inputted answer section.

Patent Document 1: Japanese Unexamined Patent Application Publication No. 2016-053773

DISCLOSURE OF THE INVENTION

Problems to be Solved by the Invention

It is an object of this invention to provide a system for notifying a user of whether contents displayed on, for example, terminals between a plurality of users are identical. It is an object of this invention to provide a system that notifies a sharer of information regarding an inputted answer section.

Solutions to the Problems

There is provided a system for notifying a user of whether contents displayed on terminals between a plurality of users are identical. There is also provided a system with which, when an input is made on one terminal in one answer section of a questionnaire, information regarding a question item corresponding to the above-described answer section is displayed on another terminal.

This invention is based on a knowledge that a presentation and the like can be efficiently performed by notifying a sharer of whether contents displayed on terminals between a plurality of users are identical and notifying a sharer of information regarding an inputted answer section.

This system is connected to a first terminal and a second terminal having the following aspects.

An object displayed on the first terminal is a first object. An object displayed on the second terminal is a second object. A display regarding that the first object and the second object are identical is an identicalness sign. A display regarding that the first object and the second object are different is a discrepancy sign. The identicalness sign and the discrepancy sign are displayed on any one or both of a screen of the first terminal and a screen of the second terminal.

In one preferable aspect of this system, the object displayed on the screen of the first terminal is a presentation material, a questionnaire, a photograph, an image, a moving image, or a text.

In one preferable aspect of this system, both of the identicalness sign and the discrepancy sign are displayed on any one or both of the screen of the first terminal and the screen of the second terminal. The identicalness sign and the discrepancy sign have any one type or two or more types of different color, icon, figure, and displayed character.

In one preferable aspect of this system, when the object is displayed on the screen of the second terminal by a sharing instruction from the first terminal, information is displayed on the first terminal as follows.

In the case of the above, identification information regarding the second terminal and any one or both of the identicalness sign and the discrepancy sign are displayed on the first terminal.

One preferable aspect of this system has the following aspects.

The system 1 is connected to one or a plurality of terminals other than the first terminal or the second terminal.

When the identicalness sign is displayed on the first terminal, a number of terminals on which an object identical to the first object is displayed on display units and other than the first terminal or a proportion of terminals on which an object identical to the first object is displayed on display units and other than the first terminal is displayed.

When the discrepancy sign is displayed on the first terminal, a number of terminals on which an object identical to the first object is not displayed on display units or a proportion of terminals on which an object identical to the first object is not displayed on display units is displayed.

One preferable aspect of this system has the following aspects. The first object is a questionnaire including a plurality of question items and a plurality of answer sections corresponding to the plurality of question items. When there is an input on the second terminal to one answer section of the above-described questionnaire, the system causes the first terminal to display information regarding the question item corresponding to the above-described answer section.

Advantageous Effects of the Invention

There is provided a system for notifying a user of whether contents displayed on terminals between a plurality of users are identical. There also is provided a system with which, when an input is made on one terminal in one answer section of a questionnaire, information regarding a question item corresponding to the above-described answer section is displayed on another terminal.

DESCRIPTION OF PREFERRED EMBODIMENTS

The following describes a configuration for embodying the present invention using the drawings. A system 1 according to the present invention is not limited to the configuration described below, but also includes those appropriately modified within a range evident for a person skilled in the art from the configuration below.

<Outline of Information-Processing System>

Figure 1:
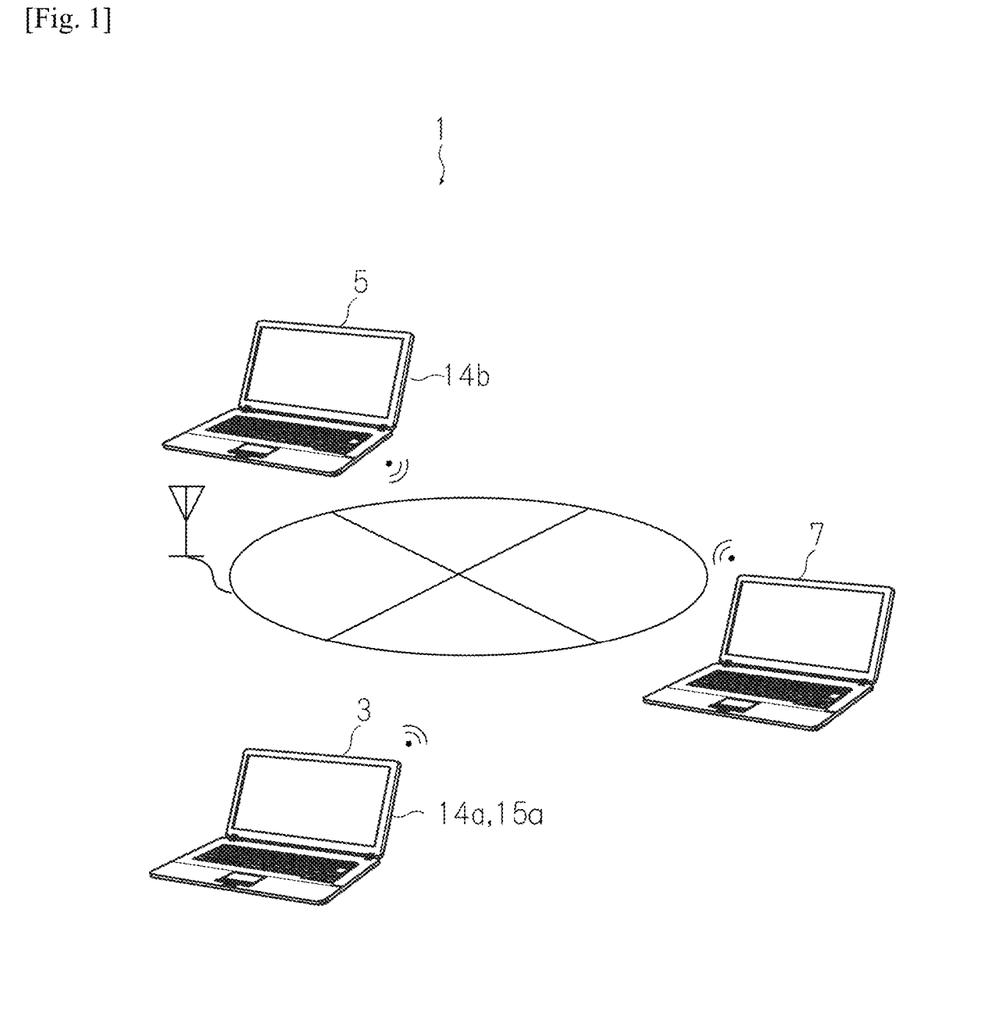
FIG. 1 is a conceptual diagram for describing a configuration of a system according to the present invention.

First, an outline of the system 1 according to the present invention will be described. FIG. 1 is a conceptual diagram for describing a configuration of the system 1 according to the present invention.

As illustrated in FIG. 1, the system 1 according to the present invention is connected with a first terminal 3 and a second terminal 5. Furthermore, the system 1 may be connected with a plurality of terminals (for example, a third terminal 6) having functions equal to those of the above-described terminals besides them. The above-described respective terminals are connected so as to be able to mutually transmit and receive information through an information communication line, such as Internet. Specific examples of the above-described respective terminals include information processing terminals, such as a computer, a tablet terminal, and a smart phone.

Note that the system 1 may be connected with an analysis server or the like for comparing displayed information on screens of the respective terminals described later. Note that when the above-described comparison process between the displayed information is performed in the respective terminals, the connection of the analysis server is not necessarily required.

This system 1 includes a displayed information comparator (14a or 14b) and an input-completed answer section specifying unit 15a.

The displayed information comparator (14a or 14b) is a component for comparing display contents of objects displayed on the respective terminals.

The input-completed answer section specifying unit 15a is a component for notifying the first terminal 3 of information regarding a question item corresponding to an answer section of a questionnaire input on the second terminal 5 and displaying the information on the first terminal 3.

The system 1 is for confirming whether the objects displayed on the screens of the respective terminals are identical. The system 1 is also for, when information is input in an answer section of a questionnaire 24 on the second terminal 5, causing the first terminal 3 to display the information regarding the question item corresponding to the answer section.

For example, in the system 1 according to the present invention, when there are two terminals, the first terminal 3 and the second terminal 5, to confirm the identity of the above-described objects, the displayed information regarding the objects displayed on the respective terminals may be transmitted to one another between the terminals. The comparison process between the displayed information is then performed based on the displayed information, and a display control of an identicalness sign 11 and a discrepancy sign 13 is performed.

When the identity of the above-described objects in the system 1 is confirmed between three or more terminals, it is preferred that any one terminal is set as a presenter terminal. For example, the first terminal 3 may be set as the presenter terminal. In this case, the displayed information regarding the objects displayed on the plurality of terminals other than the first terminal 3 is transmitted to the first terminal 3 via a communication unit.

The displayed information comparator 14a of the first terminal 3 (the presenter terminal) performs a comparison process of whether the objects displayed on the plurality of terminals other than the first terminal 3 are identical to the object displayed on the first terminal 3 based on the displayed information regarding the above-described objects.

The questionnaire 24 includes a question item 26 representing a question to a user and an answer section 28 for inputting an answer to it. The question item 26 may be one or may be plural for one questionnaire 24. Similarly, the answer section 28 may be one or may be plural for one questionnaire 24. The questionnaire 24 is displayed on a screen of each terminal by an operation of a user of each terminal. Each question item 26 corresponds to any of the answer sections 28. For example, the question item 26 may be a text representing a question content regarding an attribute or a profile of a user or may be represented in word notations. The answer section 28 is an entry field to which a user inputs an answer to the above-described question item 26. The answer section 28 may be a list box, a text box, a check box, or the like. The questionnaire 24 may be displayed by executing an application program saved in a storage unit or saved and read out as a document file.

(Configurations of First Terminal 3, Second Terminal 5, and Each Terminal)

Configurations of the first terminal 3, the second terminal 5, the third terminal 6, and each terminal will be described.

Figure 2:
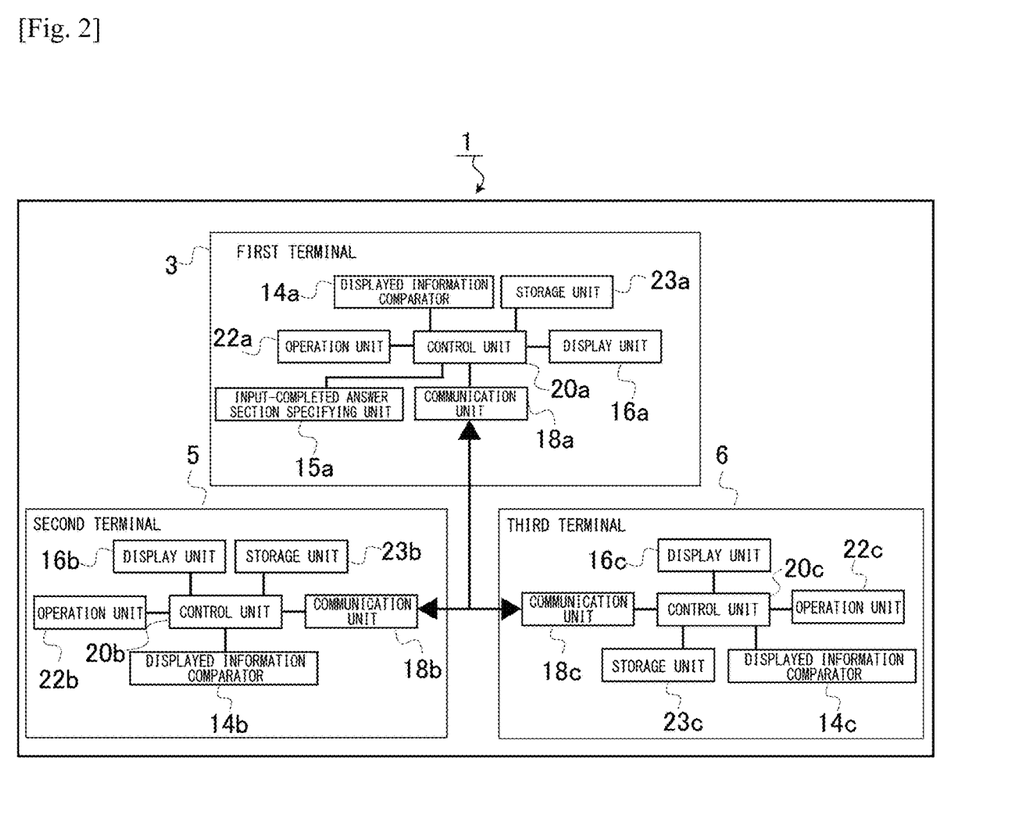
FIG. 2 is a block diagram for describing the system according to the present invention.

As illustrated in FIG. 2, the first terminal 3, the second terminal 5, and a terminal connected to the system 1 each include a display unit (16a, 16b, or 16c), a communication unit (18a, 18b, or 18c), a control unit (20a, 20b, or 20c), an operation unit (22a, 22b, or 22c), and a storage unit (23a, 23b, or 23c). Furthermore, the first terminal 3, the second terminal 5, the third terminal 6, and each terminal include the displayed information comparator (for example, 14a, 14b, or 14c). The first terminal 3 also includes the input-completed answer section specifying unit 15a.

Each component is connected via a bus or the like and configured to be able to transmit and receive information.

Each terminal may have a computer having a calculation unit. For example, the storage unit may store a control program or various kinds of information. When predetermined information is input from the operation unit, the control unit reads out the control program stored in the storage unit. The control unit reads out the information stored in the storage unit as necessary and transmits it to the calculation unit. The control unit also transmits the input information to the calculation unit, as necessary. The calculation unit performs an arithmetic operation using the received various kinds of information and stores it to the storage unit. The control unit reads out the result of the arithmetic operation stored in the storage unit and causes the display unit to display it. Thus, various kinds of processes are executed. Each component described below may correspond to any component of a computer.

(Displayed Information Comparator)

The displayed information comparator is a component for determining whether the object displayed on the display unit of the first terminal 3 is identical to the object displayed on the display unit of another terminal. For example, the above-described determination is performed in a process as follows.

Figure 3:
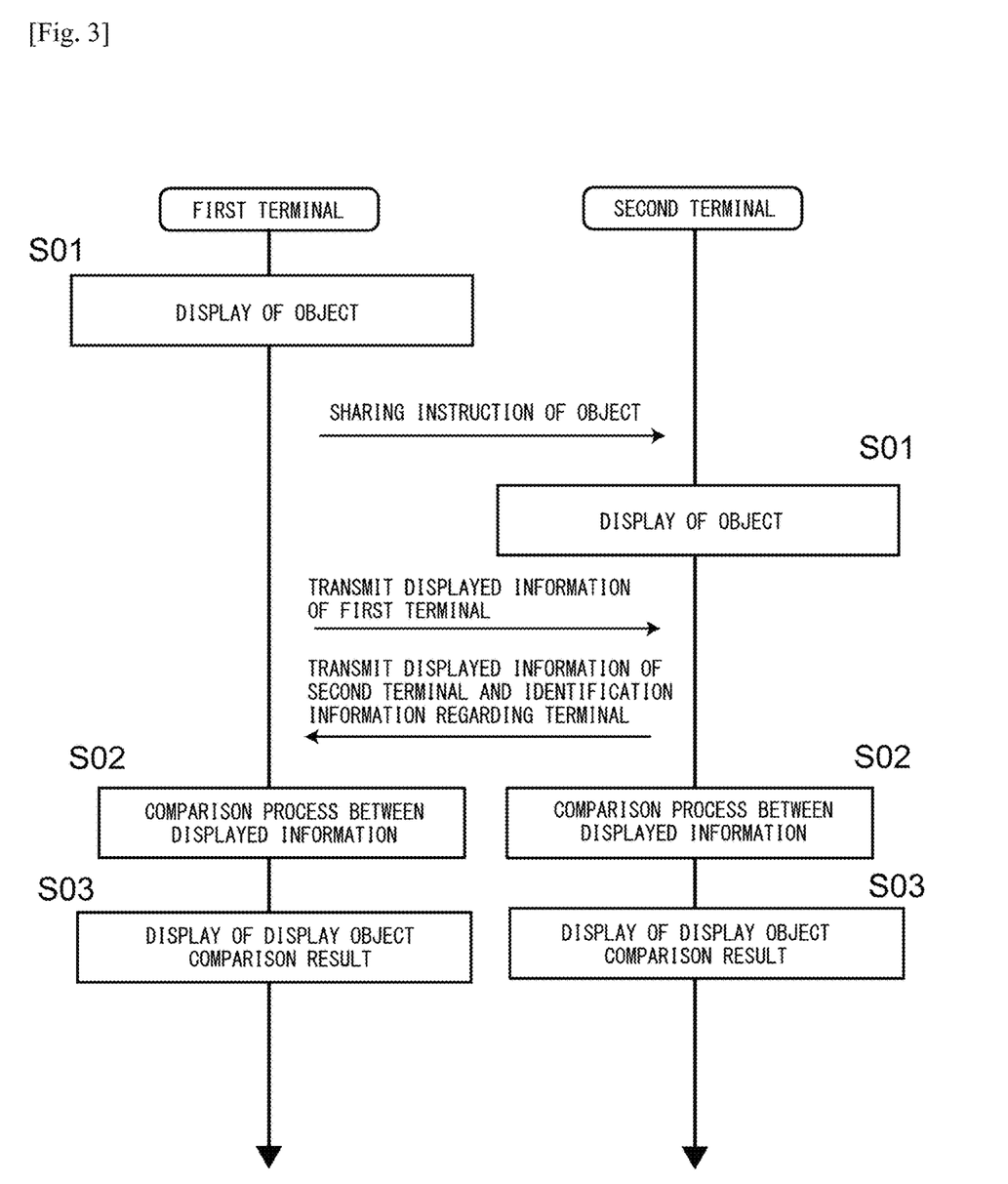
FIG. 3 is a drawing illustrating a flow when a process is performed between two terminals in the system according to the present invention.

First, a description will be given of a case where this process is executed between the first terminal 3 and the second terminal 5. FIG. 3 is a drawing illustrating a flow when the process is performed between two terminals in the system according to the present invention.

On the display unit 16*a* of the first terminal 3, a presentation material, a questionnaire, a photograph, an image, a moving image, or a text is displayed by an input by a user to the operation unit.

Figure 4:
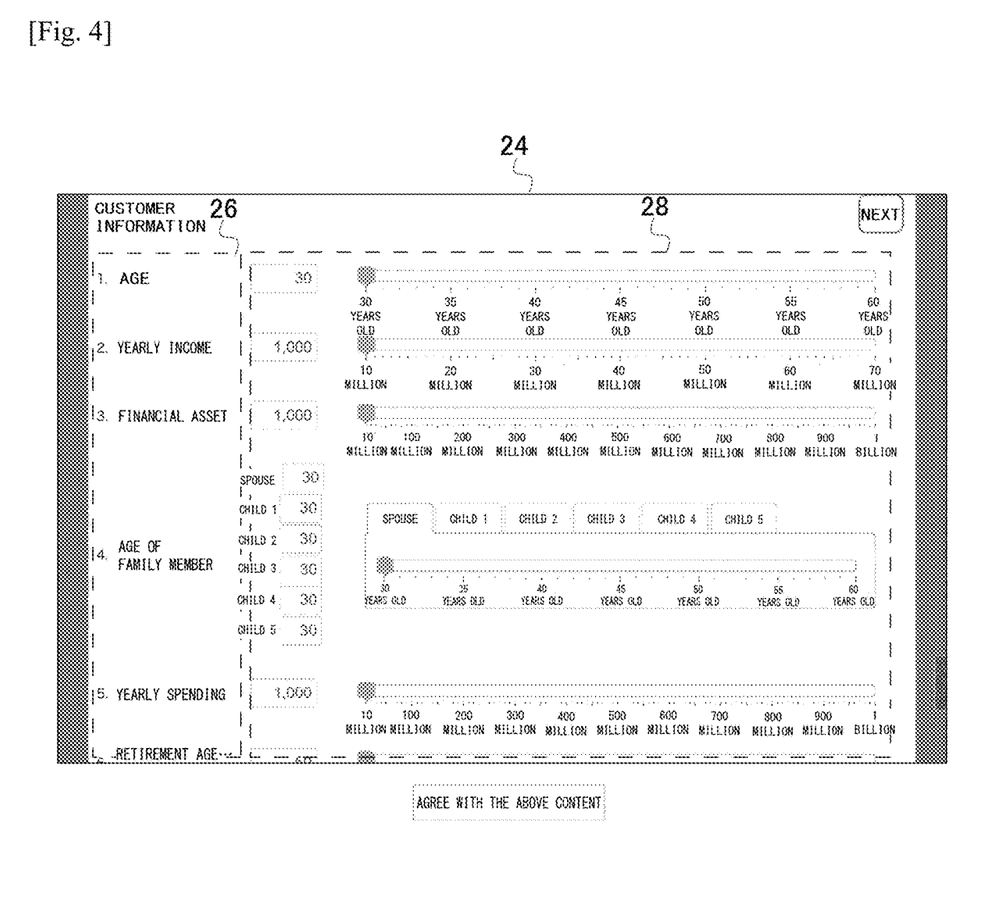
FIG. 4 is a drawing illustrating an exemplary object displayed on each terminal in the system according to the present invention.

For example, when a first object displayed on the display unit 16*a* of the first terminal 3 is a questionnaire, the first object may be the one as illustrated in FIG. 4.

The information of the above-described displayed content at a predetermined time is transmitted to the second terminal 5 via the communication unit. Similarly, on the display unit 16*b* of the second terminal 5, a presentation material, a questionnaire, a photograph, an image, a moving image, or a text is displayed by an input by a user to the operation unit. At this time, it is preferred that a sharing instruction from the first terminal 3 is transmitted to the second terminal via the communication unit and the above-described content is displayed on the display unit 16*b* of the second terminal 5 via the control unit 20*b*. The sharing instruction here means that, when the content displayed on the one terminal is displayed on another terminal, giving a permission of the display to the above-described other terminal. The displayed information of the object displayed on the second terminal 5 at the predetermined time is transmitted to the first terminal 3 via the communication unit.

Next, the displayed information comparator 14*a* of the first terminal 3 performs a comparison process between the displayed information of the second object transmitted from the second terminal 5 via the communication unit and the displayed information of the first object displayed on the display unit 16*a* of the first terminal 3. For example, by presetting parts as compared objects in the comparison process (which are referred to as displayed image comparison parts) on the screens of the above-described terminals, the comparison between image information of a displayed image comparison part regarding the object of the first terminal 3 and a displayed image comparison part regarding the object of the second terminal 5 may be performed in the comparison process between the displayed information. In this comparison between the image information, known image information analysis means may be used. Similarly, the displayed information comparator 14*b* of the second terminal 5 performs the comparison process between the displayed information of the first object transmitted from the first terminal 3 and the displayed information of the second object displayed on the display unit 16*b* of the second terminal 5.

In the above-described comparison process between the image information, the first object and the second object may be determined to be identical when a predetermined proportion or more of the information of the above-described displayed image comparison parts overlaps.

Meanwhile, the first object and the second object may be determined to be different in cases other than the above.

Information associating identification numbers of the terminals with the above-described comparison result is generated. A known image analysis technique may be used for measuring the above-described overlapping range.

Note that the predetermined proportion in the above-described comparison between the displayed image comparison parts may be 50% or more and 100% or less, 60% or more and 90% or less, 70% or more and 85% or less, or any value set by a user of the system 1. Furthermore, the displayed image comparison part may be conveniently set through the operation unit by each user of the system 1 and able to be stored in the storage unit.

Other than this, the above-described comparison process between the displayed information may be performed by obtaining and comparing coordinates of scroll positions on the screens of the respective terminals and checking whether they overlap in a predetermined range or not. The case where the comparison process between the objects displayed on the respective screens is performed between two terminals has been described above. Note that, in the above-described comparison process, the comparison between the displayed information of the objects displayed on the respective terminals may be performed based on a known method other than this.

Furthermore, the displayed information comparator may perform a comparison process whether the input content displayed on the first terminal 3 is identical to the input content displayed on the terminal other than the first terminal 3. The following describes a specific example of the above-described comparison process. First, for example, the questionnaire 24 is displayed on the display unit 16*a* of the first terminal 3 by an operation by a user. Furthermore, the above-described questionnaire 24 is displayed on the display unit of the terminal other than the first terminal 3 (here, the second terminal 5) via transmitting and receiving the file of the questionnaire 24 and the sharing instruction.

Next, assume that a user of the second terminal 5 has input information in an answer section (an answer section A1) corresponding to one question item of the questionnaire 24 via the operation unit 22*b*. Thereafter, assume that the above-described input content is reflected in an answer section (an answer section A2) corresponding to the above-described answer section A1 of the questionnaire 24 displayed on the display unit of the first terminal 3. Note that the answer section A1 and the answer section A2 are answer items corresponding to an identical question content (for example, a user attribute).

At this time, the above-described reflection of the input content may be an automatic process through a communication line or may be input by a user of the first terminal 3 directly via the operation unit 22*a*.

The displayed information of the above-described input content to the answer section A1 of the questionnaire 24 displayed on the second terminal 5 is transmitted to the first terminal 3. A comparison process between the displayed information of the input content of the answer section A2 displayed on the first terminal 3 and the displayed information of the input content of the answer section A1 of the second terminal 5 is performed in the displayed information comparator 14a. When the information is identical, the display contents of their answer sections may be determined to be identical. When the above-described information is different, the display contents of their answer sections may be determined to be different. Note that the above-described comparison result may be listed on the display units of the respective terminals by each identification number of the terminal and question item based on the above-described comparison result.

Other than the above-described comparison method, the displayed information of the objects may be compared by comparing information between a transmission completed file and a reception completed file for confirming that a file for causing the respective terminals to display the objects to be displayed has been properly transmitted and received. Specifically, for example, from the first terminal 3 to another terminal (here, the second terminal 5), a file of the object to be displayed on the display unit of the terminal (referred to as an object display file) is transmitted. Subsequently, from the first terminal 3, the transmission completed file for notifying that a transmitting process of the above-described object display file has been completed is transmitted to the second terminal 5. At this time, it is preferred to save a duplicate file of the above-described transmission completed file in the first terminal 3 side.

Next, the second terminal 5 (or may be another terminal) transmits the received transmission completion confirmation file described above to the first terminal 3 as a file for notifying that a receiving process of the above-described object display file has been completed in the second terminal 5 side (a reception completion confirmation file). At this time, it is preferred to save a duplication of the reception completion confirmation file in the second terminal 5. Note that the file transmitted to the first terminal 3 in the above-described transmitting process may be a duplicate file of the reception completion confirmation file, not the reception completion confirmation file.

In the first terminal 3, the information is compared between the above-described transmission completion confirmation file and reception completion confirmation file via the displayed information comparator 14a, and when the information is identical, the first object and the second object may be determined to be identical. When the above-described information is different, the first object and the second object may be determined to be different. In the comparison process in this case, the identification information between the files may be compared or binary data or any information included in the files may be compared. Note that the above-described transmission completion confirmation file and reception completion confirmation file may be substituted by the above-described object display files.

Next, a description will be given of a case where the system 1 is used with three or more terminals. In this case, any terminal may function as a terminal for presenter (may be the first terminal 3). That is, based on the first object displayed on the display unit 16a, a confirmation of whether the base object is identical to the objects displayed on other respective terminals is performed.

Specifically describing, first, information of displayed images of the objects displayed on the respective terminals is transmitted from the plurality of terminals connected to the system 1 via the communication unit to the first terminal 3 as the terminal for presenter. At this time, the information of the displayed images is preferred to be associated with the identification information regarding the terminal of transmission origin. With the image comparison method similar to the case performed between two terminals as described above, the displayed information comparator 14a performs a process to compare the first object with the objects of the respective terminals displayed on the terminals other than the first terminal 3. Comparison result information of the objects of the respective terminals is then generated.

This comparison result information is preferred to be comparison result information of the objects for each identification number regarding the terminals. Based on this comparison result information, the identicalness sign 11 or the discrepancy sign 13 described below is performed. Furthermore, based on the above-described information, a proportion or the number of the terminals on which the objects identical to the first object are displayed may be displayed. Similarly, based on the above-described information, a proportion or the number of the terminals on which the objects identical to the first object are not displayed may be displayed. Note that when the object displayed on the first terminal 3 is displayed on the terminal other than the first terminal 3, it is preferred that the display is performed based on the sharing instruction regarding the object from the first terminal 3 to another terminal.

(Identicalness Sign, Discrepancy Sign, Display of Number and Proportion of Terminals (Display of Display Object Result))

Figure 5:
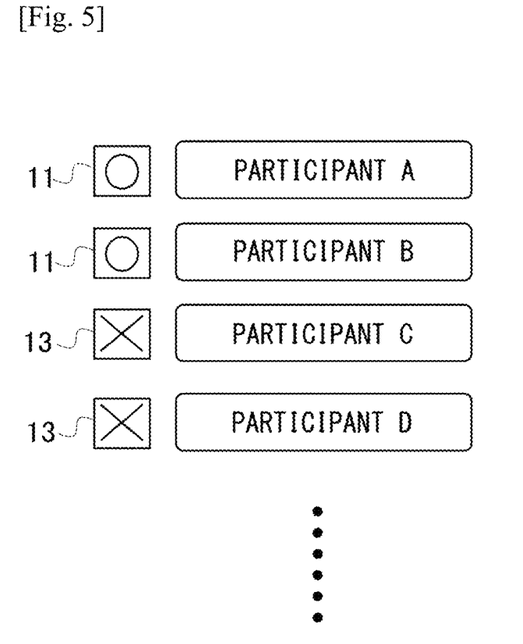
FIG. 5 is a drawing illustrating an example of identicalness signs and discrepancy signs displayed in the system according to the present invention.

FIG. 5 is a drawing illustrating an example of the identicalness signs 11 and the discrepancy signs 13 displayed in the system according to the present invention.

Figure 6:
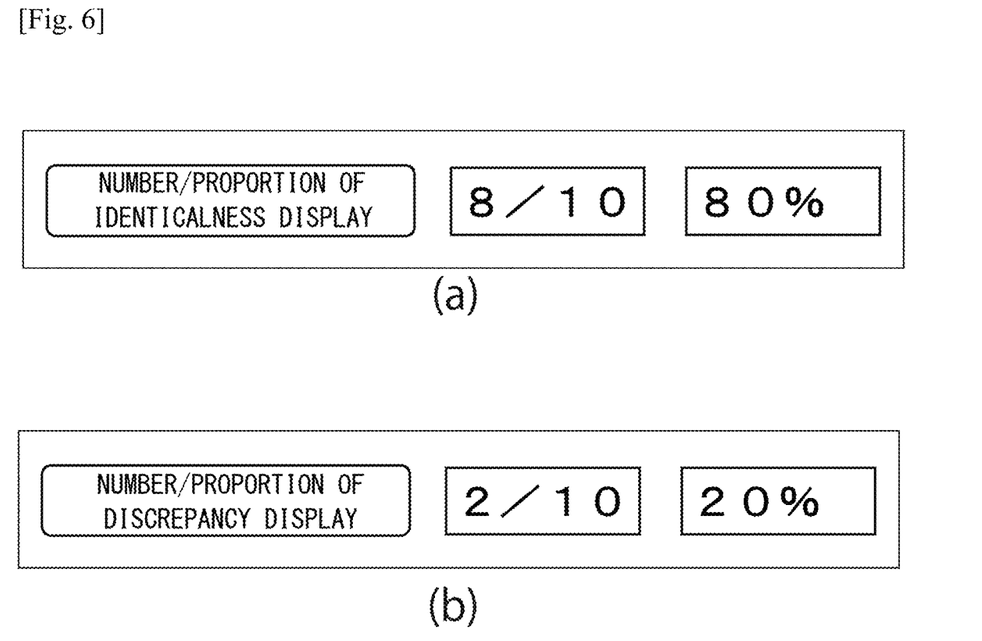
FIG. 6 is a drawing illustrating a proportion and the number of terminals of the identicalness signs and a proportion and the number of terminals of the discrepancy signs displayed in the system according to the present invention.

FIG. 6 is a drawing illustrating a proportion and the number of the terminals of the identicalness sign and a proportion and the number of the terminals of discrepancy sign displayed in the system according to the present invention. FIG. 6(a) is an example of the proportion and the number of the terminals of the identicalness sign displayed in the system according to the present invention. FIG. 6(b) is a drawing illustrating the proportion and the number of the terminals of the discrepancy sign displayed in the system according to the present invention.

Based on the comparison result information obtained by the comparison process between the displayed information, the identicalness sign 11, the discrepancy sign 13, and the display of the number and the proportion of the terminals may be performed. The identicalness sign 11 and the discrepancy sign 13 have any one type or two or more types of different color, icon, figure, and displayed character.

First, a description will be given of a case where the above-described comparison process is performed using the system 1 between two terminals (the first terminal 3 and the second terminal 5). The control unit 20a of the first terminal 3 refers to the comparison result information generated by the above-described comparison process, and when the comparison result is identical, causes the display unit 16a of the first terminal 3 to display the identicalness sign 11. When the comparison result is different, the control unit 20a of the first terminal 3 causes the display unit 16a of the first terminal 3 to display the discrepancy sign 13. At this time, it is preferred that the above-described display is for each identification number of the terminals or displayed with the user names.

In this case, the identicalness sign 11 or the discrepancy sign 13 is displayed on the display unit 16b of the second terminal 5 with the above-described method and conditions. The specific examples of the identicalness sign 11 and the discrepancy sign 13 include color, icon, figure, or character display. For example, when the identicalness sign 11 and the discrepancy sign 13 are indicated by color, it indicates that the above-described comparison result is identical when a green marker is displayed on the screen, and it indicates that the above-described comparison result is different when a yellow marker is displayed. Besides this, when the above-described comparison result is identical, a symbol "o" may be displayed, and when the above-described comparison result is different, a symbol "x" may be displayed. The above-described discrepancy sign may be performed only when a difference is present in the above-described comparison result.

Next, a description will be given of a case where a process of the system 1 is executed between three or more terminals, which are the first terminal 3, the second terminal 5, and a terminal other than the above, and a control of the identicalness sign, the discrepancy sign, and the display of the number and the proportion of terminals is performed.

In this case, the first terminal 3 may function as a terminal for presenter. The control unit 20a of the first terminal 3 refers to the comparison result for each identification number generated by the above-described comparison process, and when the comparison result is identical, displays the identicalness sign 11 on the display unit 16a of the first terminal 3. When the above-described comparison process is different, the control unit 20a of the first terminal 3 displays the discrepancy sign 13 on the display unit 16a of the first terminal 3. Furthermore, the control unit 20a of the first terminal 3 may refer to the above-described comparison result for each identification number, and display the proportion of the terminals on which objects identical to the first object are displayed on the first terminal 3.

The control unit 20a of the first terminal 3 may refer to the above-described comparison result for each identification number, and display the number or the proportion of the terminals on which objects different from the first object are displayed on the display unit of the first terminal 3.

(Input-Completed Answer Section Specifying Unit)

The input-completed answer section specifying unit 15a is a component for specifying an answer section corresponding to a question item of the questionnaire 24 input and answered on the second terminal 5. The following describes its function. First, by an input to the operation unit 22a by a user, the questionnaire 24 including a plurality of question items and answer sections corresponding to these question items is displayed on the display unit 16a of the first terminal 3. The above-described questionnaire 24 is displayed also on the display unit 16b of the second terminal 5 via the communication unit and the control unit.

At this time, the above-described questionnaire 24 is not fully displayed in some cases on the display units of the respective terminals for reasons that a display layout of the above-described questionnaire 24 is vertically or laterally long and that a size of the questionnaire 24 on screen is large. In such a case, the whole content of the questionnaire cannot be viewed unless the screen is scrolled. Therefore, problems like the following are generated.

For example, assume that there is made an input in an answer section of the second terminal 5 corresponding to an answer section not fully displayed on the display unit 16a of the first terminal 3 among the above-described answer sections displayed on the second terminal 5. Assume that its input content is transmitted to the first terminal 3 via the communication unit and is reflected on the display unit 16a. At this time, the above-described answer section is positioned at a position not fully displayed on the display unit 16a of the first terminal 3 unless, for example, the screen is scrolled, and therefore, a user of the first terminal 3 cannot sense that the above-described input is made in some cases.

Therefore, in the system 1 according to the present invention, it is made possible for a user of the first terminal 3 to sense that the above-described input is made even in the above-described case by employing the following aspect.

Assume that an input is made in any of the answer sections via the operation unit 22b of the second terminal 5 with the identical questionnaires 24 being displayed on the display units of the first terminal 3 and the second terminal 5. At this time, identification information of the above-described question items and answer sections is transmitted to the first terminal 3 via the communication unit from the second terminal 5. It is preferred that the identification information regarding the second terminal 5 is included in the above-described transmitted content.

Once the above-described information is received in the first terminal 3 via the communication unit, the input-completed answer section specifying unit 15a generates a message and information on a display content for notifying a user of the first terminal 3 of an input position for the above-described answer based on the information.

The input-completed answer section specifying unit 15a generates a message and a display content regarding the question item corresponding to the first terminal 3 by specifying the corresponding question item based on the identification number of the inputted answer section. It is preferred that the above-described message and display content represent a user name (or may be identification information of the terminal) that has made an input to the answer section and the question item to which the input has been made.

When the user of the second terminal 5 (assumed to be Person A) has made an input in an answer section "household section," these message and display content may be like "Person A has made input in household section." The message and the display content are displayed on the display unit 16a via the control unit 20a of the first terminal 3.

Figure 7:
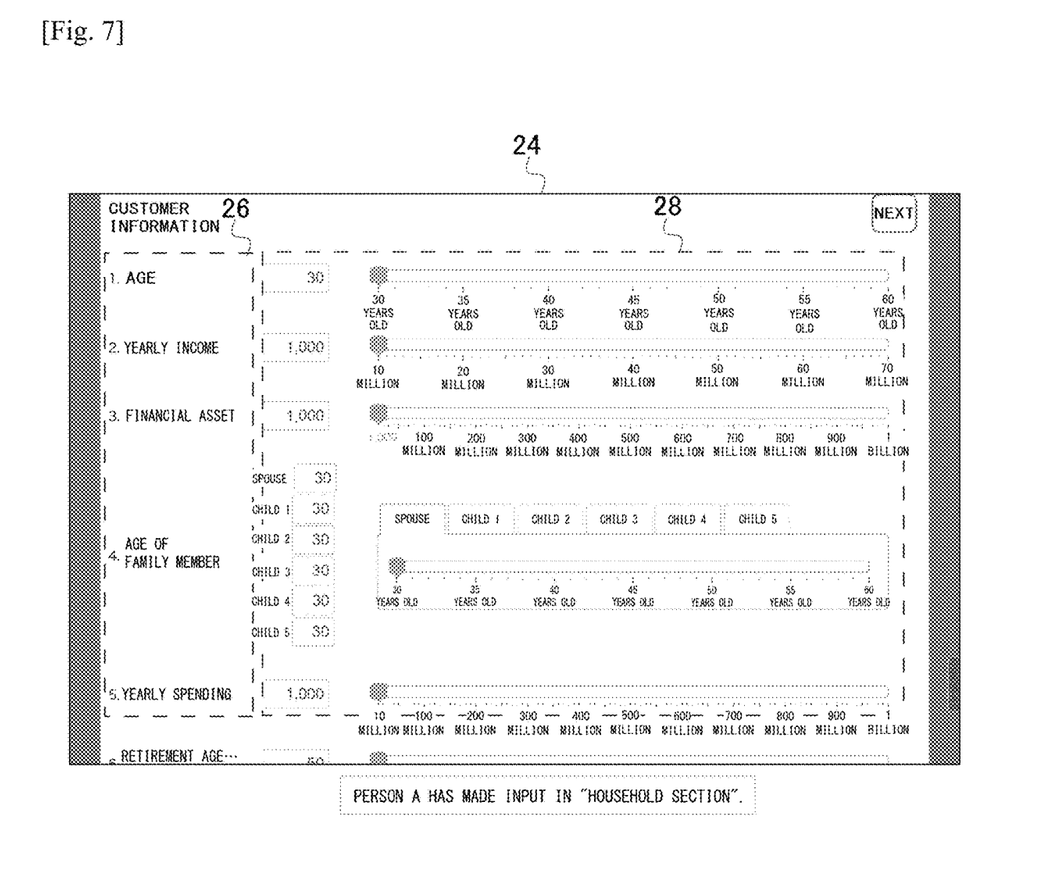
FIG. 7 is a drawing exemplarily illustrating a display content displayed on a first terminal when an input is made on a second terminal in an answer section in the system according to the present invention.

FIG. 7 is a drawing exemplarily illustrating when the user of the second terminal 5 makes an input in the answer section "household section."

Besides this, when the user of the second terminal 5 makes an input that he or she agrees with the input information in the answer section via the operation unit, a message that indicates the user name and that he or she agrees may be displayed on the display unit of the first terminal 3.

(Display Unit, Communication Unit, Control Unit, and Operation Unit)

The first terminal 3, the second terminal 5, and the terminal connected to the system 1 may basically have the display unit, the communication unit, and the control unit.

The display unit (16a, 16b, or 16c) is a component for displaying visual information, such as an image and a moving image. The display unit (16a, 16b, or 16c) may, for example, be various kinds of display devices.

The communication unit (18a, 18b, or 18c) is configured of a communication interface, and has a function for transmitting and receiving information between the respective terminals connected to the system 1. The respective terminals, for example, transmit various kinds of information, such as the displayed information of the objects displayed on the display units of the respective terminals, to another terminal and receive various kinds of information, such as the displayed information of the object displayed on the display unit of another terminal, via this component.

The control unit (20a, 20b, or 20c) is means for controlling each unit, such as transmitting and receiving information, storing information in the storage unit, and controlling the display content to the display unit.

The operation unit (22a, 22b, or 22c) is a component for receiving inputs of operation information from users of the respective terminals described above. The operation information input via the operation unit is transmitted to the control unit and used for controlling each terminal.

Various kinds of keyboards, mouses, and touch panels used in known information processing terminals can be employed for the operation unit. The touch panel configuring the operation unit may configure a touch panel display together with the display configuring the display unit.

<1. Operation of Information Process of System 1 (when Three or More Terminals are Connected to System 1)>

Figure 8:
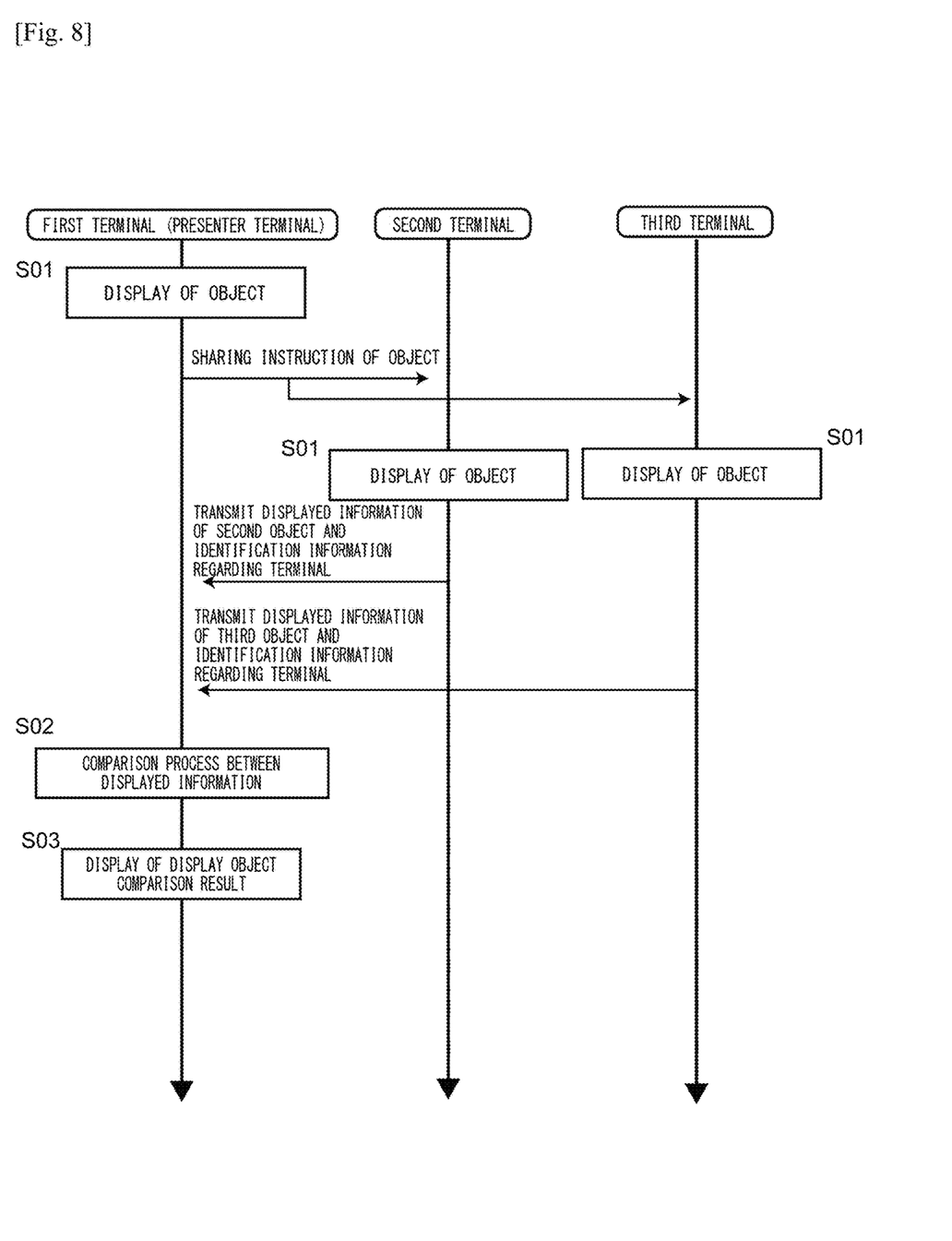
FIG. 8 is a drawing illustrating a flow when a process is performed between three terminals in the system according to the present invention.

Next, a process of an information-processing system according to one example of the embodiment of the present invention will be described. FIG. 8 is a drawing illustrating a processing flow when the process is performed between three terminals in the system according to the present invention.

Note that the processing flow described below is one example of an internal process for achieving the system 1 according to the present invention, and the internal process usable for the system 1 according to the present invention is not limited to the example below.

(1-1. Transmission and Reception of Displayed Information of Object Displayed on Terminal)

The following example describes a case where three or more terminals are connected to the system 1 and a user of the first terminal 3 is a presenter who presents an information material in the system 1.

The user of the first terminal 3 (the presenter terminal) operates the operation unit 22a to display the first object on the display unit 16a of the first terminal 3. A sharing instruction regarding the first object is transmitted to the terminals other than the first terminal 3 connected to the system 1 via the communication unit, and images of the above-described first object are displayed on the display units of these terminals (display of object: S01).

(1-2. Comparison Process Between Displayed Information of Objects Displayed on Terminals and Obtainment of Comparison Result)

In the displayed information comparator 14a of the first terminal 3, a comparison process between the displayed information of the second object received from the second terminal 5 and the displayed information of the first object displayed on the first terminal 3 is performed in the above-described method (comparison process between displayed information: S02).

Similarly, in the displayed information comparator 14a of the first terminal 3, a comparison process between displayed information of a third object received from the third terminal 6 and displayed information of the first object displayed on the first terminal 3 is performed in the above-described method (comparison process between displayed information: S02). Based on this comparison process between the displayed information, the first terminal 3 can obtain comparison result information of the displayed information whether the first object and the object displayed on another terminal are identical or not.

Note that, when the above-described comparison result is different, a re-transmission instruction for prompting to re-transmit the above-described displayed information (re-transmission of the information from a terminal other than the first terminal 3 to the first terminal 3) may be transmitted from the first terminal 3 to another terminal (for example, the second terminal 5 or the third terminal 6) via the control unit and the communication unit. This re-transmission instruction may be, for example, message information displayed on the screen. When the comparison result is different, this re-transmission instruction may be transmitted from the first terminal 3 to the second terminal 5, the third terminal 6, or the like (the terminal having the different comparison result of the displayed information from that of the first terminal 3) in this exemplary process.

In view of this, the latest information displayed on the first terminal 3 is prompted to be displayed on other respective terminals.

Note that this comparison process may be in an aspect where it is executed, not in the first terminal 3, but in an analysis server or the like connected to the system 1, and only its comparison result is transmitted from the analysis server to the first terminal 3 and the like.

(1-3. Display of Display Object Comparison Result)

Next, in the first terminal 3, the display control of the identicalness sign 11 and the discrepancy sign 13 is performed based on the comparison result of the above-described displayed information. As described above, according to whether the comparison result of the displayed information is identical or not, the display control of the identicalness sign 11 and the discrepancy sign 13, and its proportion and the number of the terminals may be performed for each identification number of each terminal (display of display object comparison result: S03).

<2. Operation of Information Process in System 1 (when Questionnaire is Displayed)>

Figure 9:
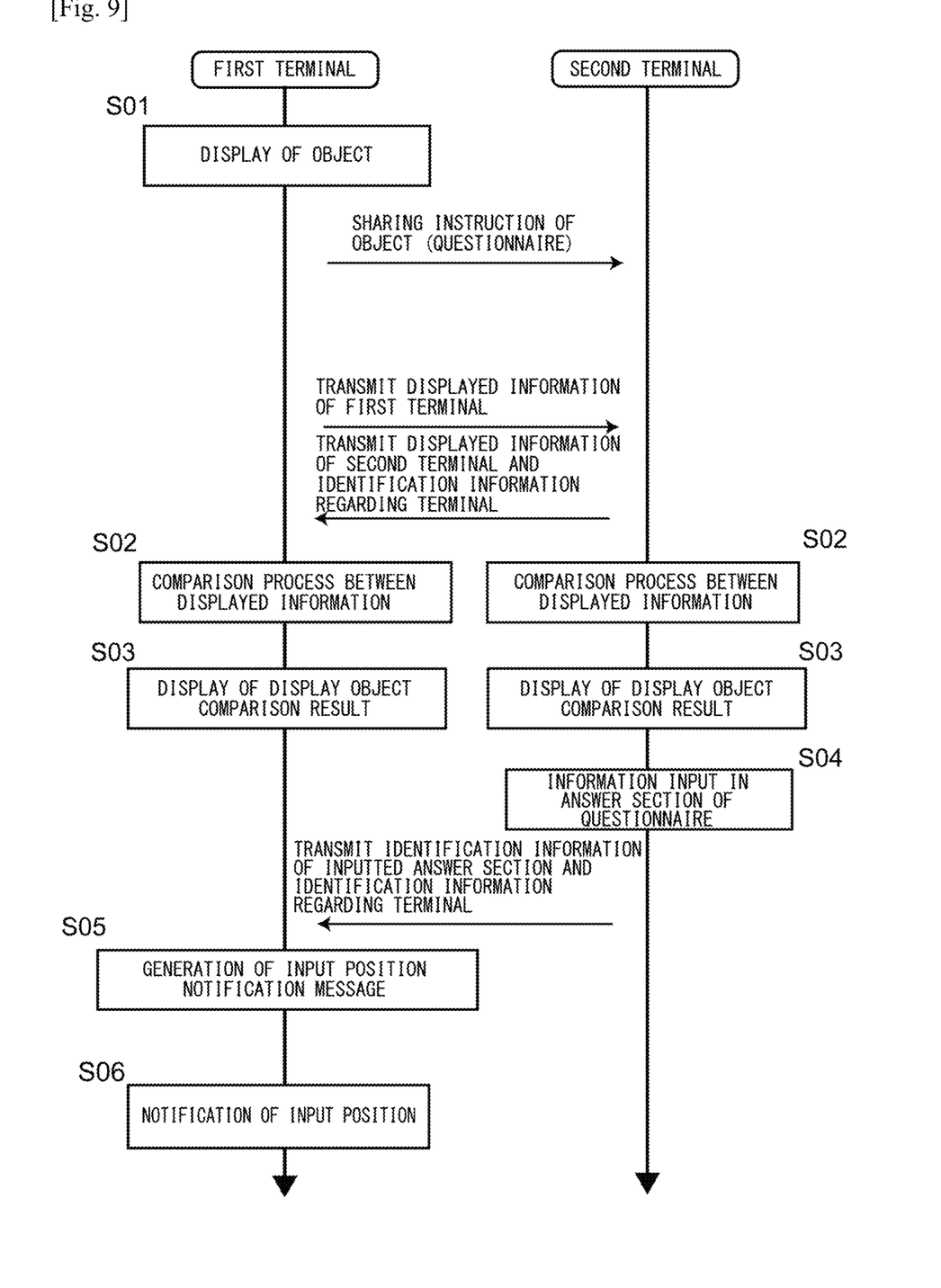
FIG. 9 is a drawing illustrating a flow when a process is performed between two terminals in the system according to the present invention and when a questionnaire is displayed on a screen.

In the following example, a description will be given of a case where the process of the system 1 is executed between two terminals, and the questionnaire 24 is displayed on the display units of the first terminal 3 and the second terminal 5. FIG. 9 is a drawing illustrating a processing flow when the process is performed between two terminals in the system according to the present invention and the displayed object is the questionnaire 24.

(2-1. Notification of Input Position)

First, after the input by a user to the operation unit and the comparison process between the sharing instruction and the displayed information described above, the identical questionnaires 24 are displayed on the display units of the first terminal 3 and the second terminal 5.

Next, when an input in any of the answer sections of the above-described questionnaire 24 (information input in answer section of questionnaire: S04) is made on the second terminal 5, identification information of the answer section and identification information of the terminal to which the input was made are transmitted to the first terminal 3. The input position specifying unit 15a of the first terminal 3 generates a message and a display content for notifying a user of the first terminal 3 of the input position of the above-described answer by the above-described method (generation of input position notification message: S05). The message that notifies the input position is displayed on the first terminal 3 (notification of input position: S06).

In the description of this application, the embodiment according to the present invention has been described above with reference to the drawings for achieving the content of the present invention. However, the present invention is not limited to the above-described embodiment, but encompasses modified configurations and improved configurations evident for a person skilled in the art based on the items described in the description of this application.

This description provides a program for causing a computer to function as the above-described system and an information recording medium storing the program. This program is implemented in a computer, and causes the computer to function as a system having means that performs the comparison process between the displayed information for confirming whether the object displayed on the first terminal 3 and the object displayed on another terminal are identical or not, and means that generates the input position notification message for notifying a user of the information regarding the answer section input in the questionnaire.

INDUSTRIAL APPLICABILITY

This invention can be used in the information communication industry.

DESCRIPTION OF REFERENCE SIGNS

1 . . . system
3 . . . first terminal
5 . . . second terminal
6 . . . third terminal
11 . . . identicalness sign
13 . . . discrepancy sign
14a . . . displayed information comparator
14b . . . displayed information comparator
14c . . . displayed information comparator
15a . . . input-completed answer section specifying unit
16a . . . display unit
16b . . . display unit
16c . . . display unit
18a . . . communication unit
18b . . . communication unit
18c . . . communication unit
20a . . . control unit
20b . . . control unit
20c . . . control unit
22a . . . operation unit
22b . . . operation unit
22c . . . operation unit
23a . . . storage unit
23b . . . storage unit
23c . . . storage unit
24 . . . questionnaire
26 . . . question item
28 . . . answer section

The invention claimed is:

1. A system (1) connected to a first terminal (3) and a second terminal (5), wherein
when an object displayed on a screen of the first terminal (3) is a first object and an object corresponding to the first object displayed on a screen of the second terminal (5) is a second object, the system (1) causes any one or both of the screen of the first terminal (3) and the screen of the second terminal (5) to display:
any one or both of an identicalness sign (11) as a sign which shows that the first object and the second object are identical, and a discrepancy sign (13) as a sign which shows that the first object and the second object are different; wherein
when the object is displayed on the screen of the second terminal (5) by a sharing instruction from the first terminal (3), the first terminal (3) displays:
an identification information regarding the second terminal (5), and
any one or both of the identicalness sign (11) and the discrepancy sign (13).

2. The system (1) according to claim 1, wherein
the first object is a presentation material, a questionnaire, a photograph, an image, a moving image, or a text.

3. The system (1) according to claim 1, wherein
the system (1) causes any one or both of the screen of the first terminal (3) and the screen of the second terminal (5) to display both of the identicalness sign (11) and the discrepancy sign (13), and
the identicalness sign (11) and the discrepancy sign (13) have any one type or two or more types of different color, icon, figure, and displayed character.

4. The system (1) according to claim 1, wherein
the system (1) is connected to one or a plurality of terminals other than the first terminal (3) or the second terminal (5),
when the identicalness sign (11) is displayed on the first terminal (3), a number of terminals on which an object identical to the first object is displayed on display units and other than the first terminal (3) or a proportion of terminals on which the object identical to the first object is displayed on display units and other than the first terminal (3) is displayed, and
when the discrepancy sign (13) is displayed on the first terminal (3), a number of terminals on which the object identical to the first object is not displayed on display units or a proportion of terminals on which the object identical to the first object is not displayed on display units is displayed.

5. The system (1) according to claim 1, wherein
the first object is a questionnaire (24) including a plurality of question items (26) and a plurality of answer sections (28) corresponding to the plurality of question items (26), and
when the second terminal (5) receives information to one answer section (28) of the questionnaire (24), the system (1) causes the first terminal (3) to display information regarding the question item (26) corresponding to the one answer section (28).

6. A non-transitory computer-readable medium encoded with a computer program, where when the computer program is executed, the computer program causes the computer to function as:
a system (1) connected to a first terminal (3) and a second terminal (5),
when an object displayed on a screen of the first terminal (3) is a first object and an object corresponding to the first object displayed on a screen of the second terminal (5) is a second object, the computer causes any one or both of the screen of the first terminal (3) and the screen of the second terminal (5) to display:
any one or both of an identicalness sign (11) as a display regarding that the first object and the second object are identical, and
a discrepancy sign (13) as a display regarding that the first object and the second object are different, wherein
when the object is displayed on the screen of the second terminal (5) by a sharing instruction from the first terminal (3), the first terminal (3) displays:
identification information regarding the second terminal (5), and
any one or both of the identicalness sign (11) and the discrepancy sign (13).

* * * * *